(12) United States Patent
He et al.

(10) Patent No.: US 11,480,205 B2
(45) Date of Patent: Oct. 25, 2022

(54) BOX LATCH

(71) Applicant: Unilumin Group Co., Ltd., Shenzhen (CN)

(72) Inventors: Jinfeng He, Shenzhen (CN); Xinhan Deng, Shenzhen (CN)

(73) Assignee: UNILUMIN GROUP CO., LTD., Shenzhen (CN)

(*) Notice: Subject to any disclaimer, the term of this patent is extended or adjusted under 35 U.S.C. 154(b) by 802 days.

(21) Appl. No.: 16/378,941

(22) Filed: Apr. 9, 2019

(65) Prior Publication Data
US 2020/0132096 A1  Apr. 30, 2020

(30) Foreign Application Priority Data
Oct. 26, 2018 (CN) .......................... 201811257854.2

(51) Int. Cl.
*F16B 5/00* (2006.01)
*F16B 21/18* (2006.01)

(52) U.S. Cl.
CPC ............ *F16B 5/0088* (2013.01); *F16B 21/18* (2013.01); *F16B 5/0024* (2013.01); *F16M 2200/02* (2013.01)

(58) Field of Classification Search
CPC ...... F16B 5/0088; F16B 21/18; F16B 5/0024; F16B 2/04; F16B 2/14; F16B 5/00; F16B 5/0056; F16M 2200/02; G09F 9/3026
See application file for complete search history.

(56) References Cited

U.S. PATENT DOCUMENTS

| 1,350,545 | A | 8/1920 | Cook |
| 2,226,505 | A | 12/1940 | Saurer |
| 6,695,524 | B2 | 2/2004 | Monson et al. |
| 10,061,553 | B2 * | 8/2018 | Hall ............... G06F 3/1446 |

(Continued)

FOREIGN PATENT DOCUMENTS

| CN | 202855212 | * | 4/2013 |
| CN | 202855212 U |   | 4/2013 |

(Continued)

OTHER PUBLICATIONS

Sai video vision youtube video dated Mar. 14, 2018; https://www.youtube.com/watch?v=ZmbNgDmZDvo (Year: 2018).*

(Continued)

*Primary Examiner* — Terrell L McKinnon
*Assistant Examiner* — Ding Y Tan
(74) *Attorney, Agent, or Firm* — Dinsmore & Shohl LLP

(57) ABSTRACT

The present invention provides a box latch. The box latch is provided with two wedge-shaped pins symmetrically arranged around its center, and the two wedge-shaped pins are movable into a wedge-shaped notch formed by mating parts of two spliced adjacent boxes and mating with the wedge-shaped pin to lock the two adjacent boxes. The two wedge-shaped pins are symmetrically arranged around its center such that only one box latch is required to lock two adjacent boxes together, reducing the number of splicing steps and box latches, further saving manpower and material resources. In addition, the wedge-shaped pin and the wedge-shaped notch are shaped and configured to mate with each other such that self-locking occurs when they are locked, thus providing a stable connection of the boxes.

9 Claims, 16 Drawing Sheets

(56) References Cited

U.S. PATENT DOCUMENTS

| | | | | |
|---|---|---|---|---|
| 11,150,855 B2* | 10/2021 | Monsees | ............... | F16M 13/02 |
| 2013/0010408 A1* | 1/2013 | Lin | ..................... | E05C 19/14 |
| | | | | 361/679.01 |
| 2014/0268565 A1* | 9/2014 | Cox | ..................... | G09F 9/33 |
| | | | | 361/692 |
| 2017/0017315 A1* | 1/2017 | Laflamme | ............. | G06F 3/016 |
| 2019/0251879 A1* | 8/2019 | Hall | ..................... | G06F 1/188 |

FOREIGN PATENT DOCUMENTS

| | | | | |
|---|---|---|---|---|
| CN | 10724838 | * | 10/2017 | |
| DE | 19948868 A1 | | 12/2001 | |
| EP | 2042748 A1 | | 1/2009 | |
| EP | 2230410 A1 | | 9/2010 | |
| KR | 20110032180 A | | 3/2011 | |
| SU | 403889 A1 | | 10/1973 | |
| WO | 1985004694 A1 | | 10/1985 | |
| WO | 2015011601 A1 | | 1/2015 | |
| WO | WO-2015011601 A1 * | | 1/2015 | ............ F16B 5/0072 |

OTHER PUBLICATIONS

Hiru LED advertising youtube video dated Aug. 7, 2018; https://www.youtube.com/watch?v=O-YcytRpvvw (Year: 2018).*
WAC Lighting HX-BN H Track X Connector sold on amazon.com dated: Jul. 2009 https://www.amazon.com/WAC-Lighting-HX-BN-Connector-Brushed/dp/B002I7MD9O?th=1 (Year: 2009).*
Donguan SYX led display accessory_quick lcok latch (Year: 2018).*
Extended European Search Report dated Oct. 15, 2019 in corresponding European patent case 19166988.6.

\* cited by examiner

＃ BOX LATCH

CROSS REFERENCE TO RELATED APPLICATION

This application claims priority to Chinese Patent Application 2018112578542 filed Oct. 26, 2018, the content of which is incorporated herein by reference in its entirety.

FIELD OF THE INVENTION

The invention relates to the field of mechanical connection, in particular to a box latch for connecting light emitting diode (LED) boxes.

BACKGROUND OF THE INVENTION

In the prior art, two adjacent LED boxes are typically connected and locked together by a latch. It is troublesome for connecting and locking a plurality of display boxes. For example, when connecting and locking two pairs of display boxes, four latches are required to connect and lock adjacent display boxes respectively, resulting in a waste of latches. In addition, connecting and locking adjacent display boxes require four steps, which wastes both human and material resources.

SUMMARY OF THE INVENTION

The technical problem to be solved by the invention is to provide a box latch that is simple in structure and easy to operate, greatly reducing the cost of connecting boxes.

In order to solve the above technical problems, the technical solution adopted by the present invention is:

a box latch, provided with a wedge-shaped pin arranged in the box latch, wherein the wedge-shaped pin is movable into a wedge-shaped notch formed by mating parts of two spliced adjacent boxes and mating with the wedge-shaped pin to lock the two adjacent boxes.

The present invention has the following advantages: a box latch provided with a wedge-shaped pin arranged therein, wherein the wedge-shaped pin is movable into a wedge-shaped notch formed by mating parts of two spliced adjacent boxes and mating with the wedge-shaped pin to lock the two adjacent boxes. The wedge-shaped pin of the box latch mates with the wedge-shaped notch of the box such that two adjacent boxes can be locked together. In addition, the wedge-shaped pin and the wedge-shaped notch are shaped and configured to mate with each other such that self-locking occurs when they are locked, thus providing a stable connection of the boxes.

Figure 1:
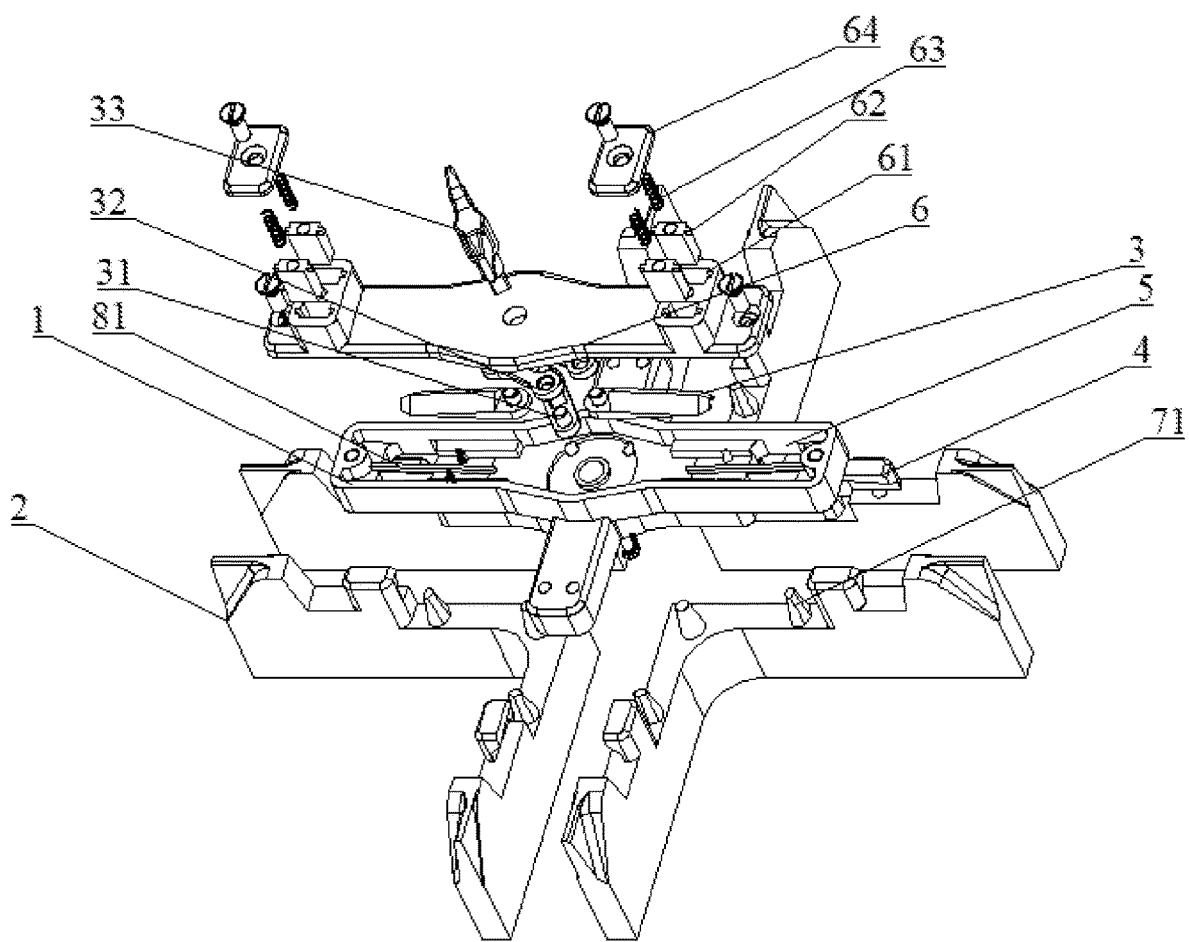
FIG. 1 is a first exploded view of a box latch with a box body according to an embodiment of the present invention.
Figure 2:
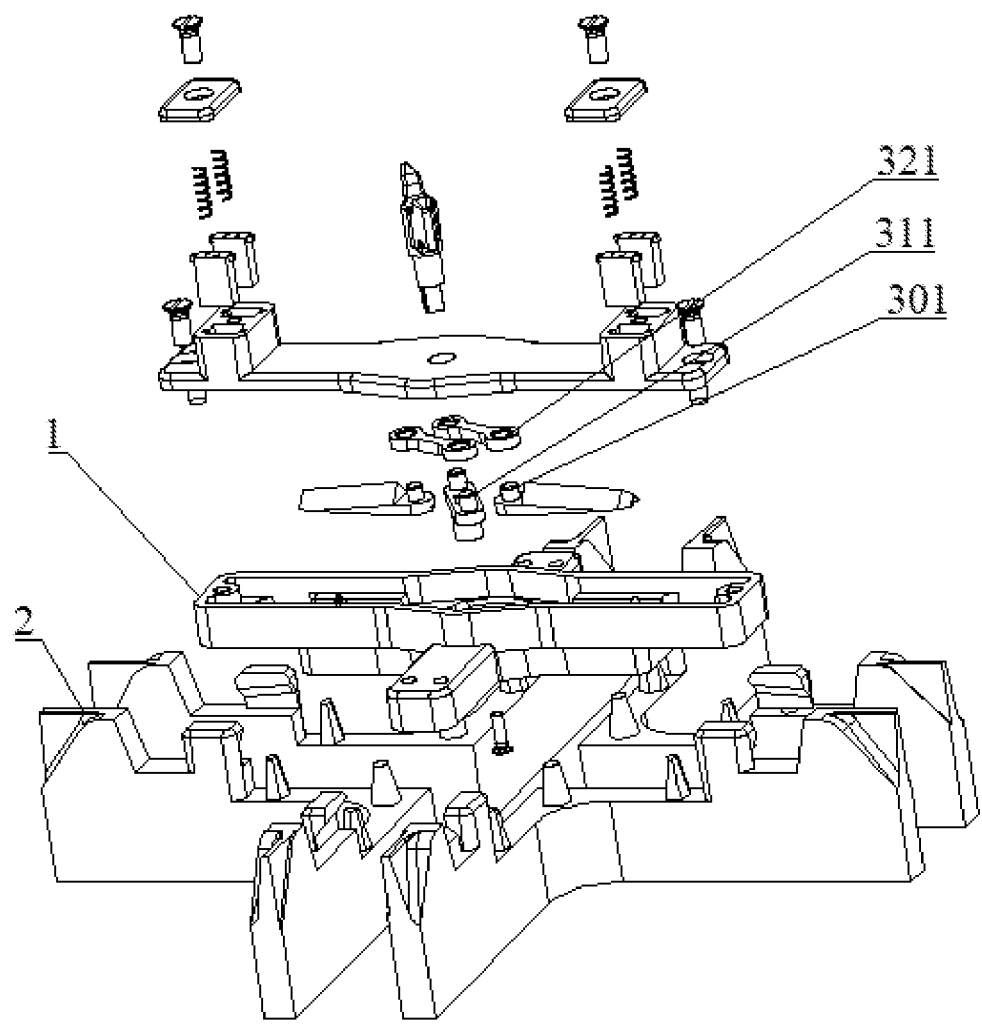
FIG. 2 is a second exploded view of a box latch with a box body according to an embodiment of the present invention.
Figure 3:
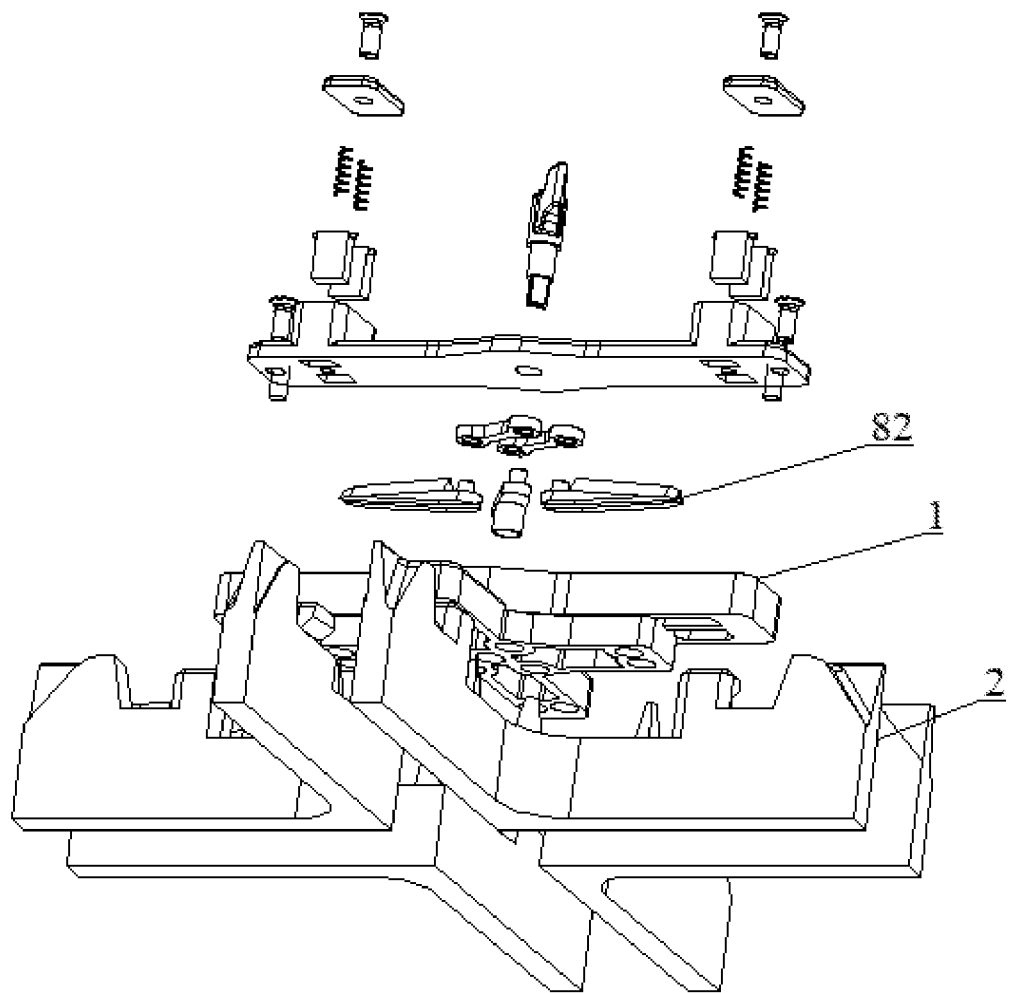
FIG. 3 is a third exploded view of a box latch with a box body according to an embodiment of the present invention.
Figure 4:
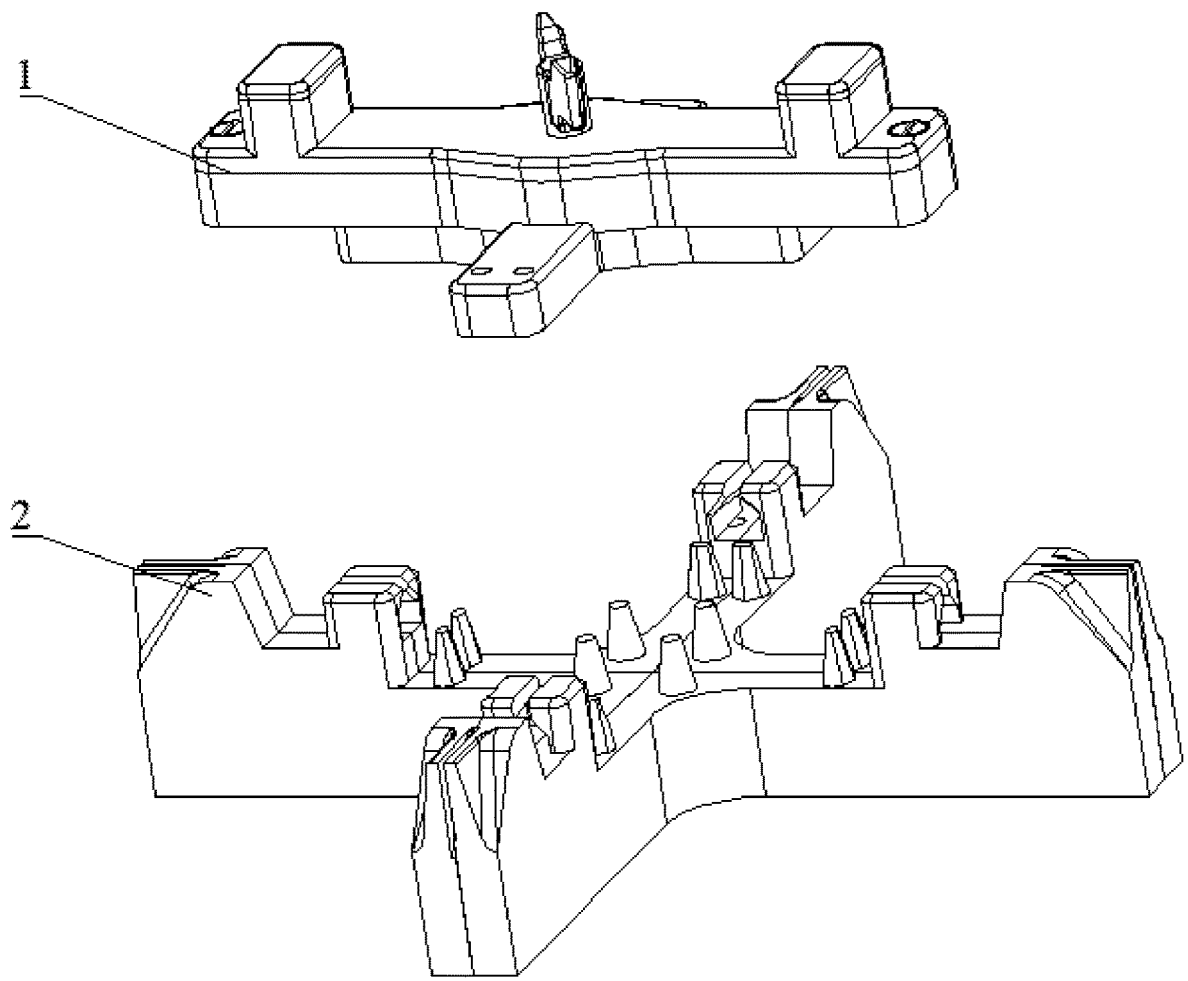
FIG. 4 is a first structural schematic view of a box latch unconnected with a box body according to an embodiment of the present invention.
Figure 5:
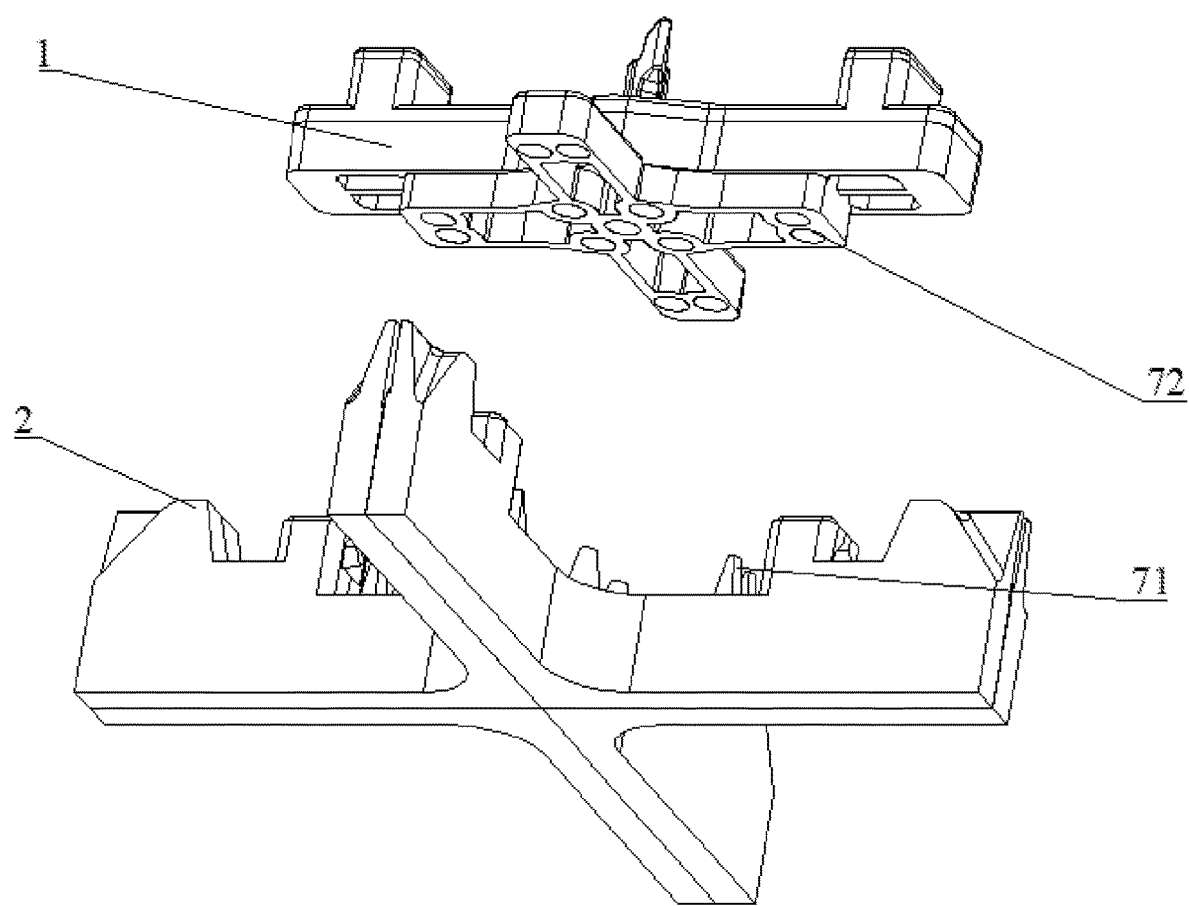
FIG. 5 is a second structural schematic view of a box latch unconnected with a box body according to an embodiment of the present invention.
Figure 6:
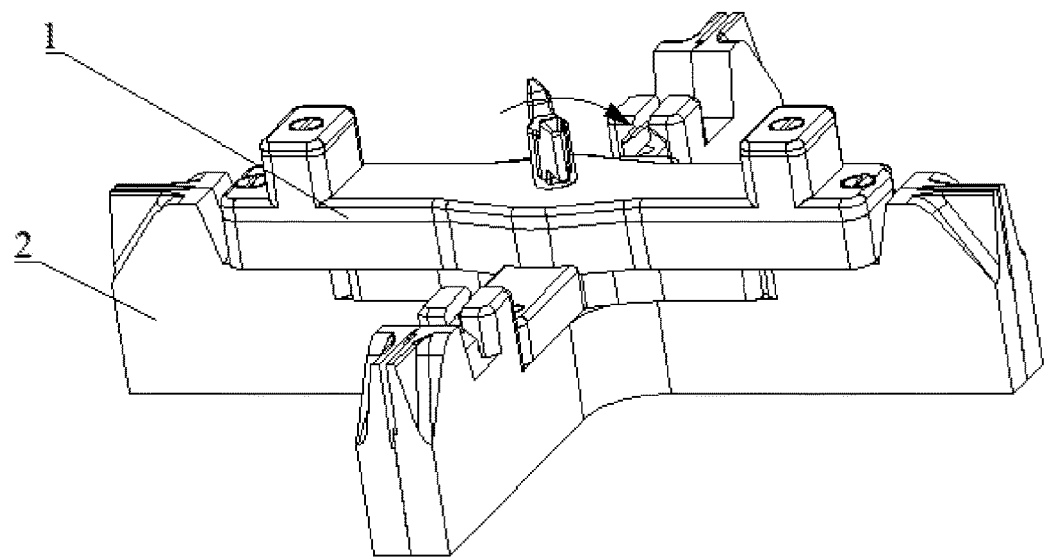
FIG. 6 is a structural schematic view of an unlocked box latch connected with a box body according to an embodiment of the present invention.
Figure 7:
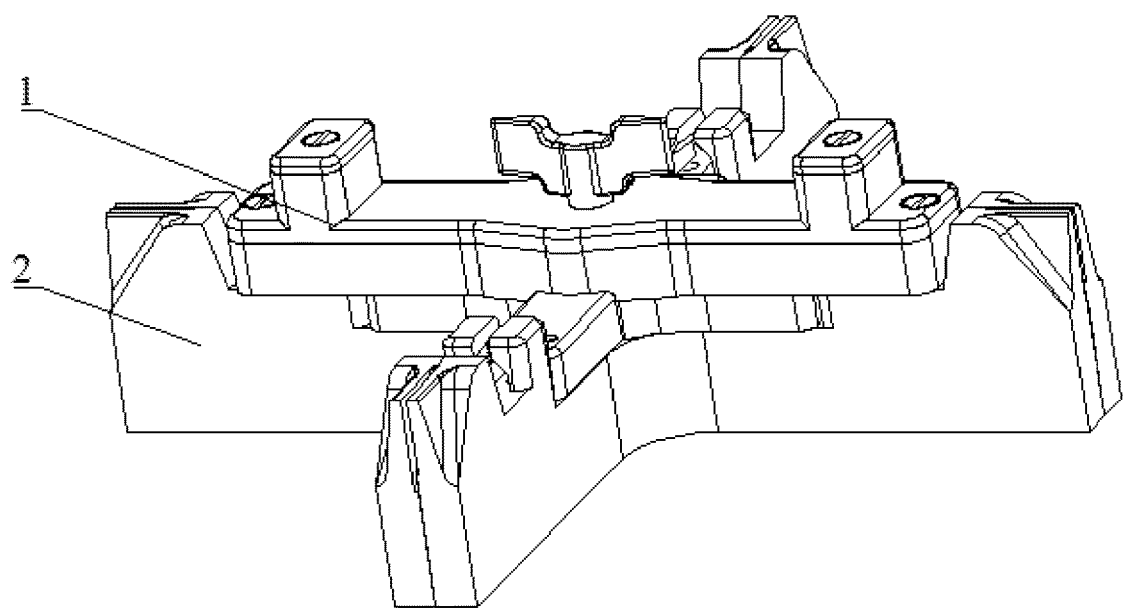
FIG. 7 is a structural schematic view of a locked box latch connected with a box body according to an embodiment of the present invention.
Figure 8:
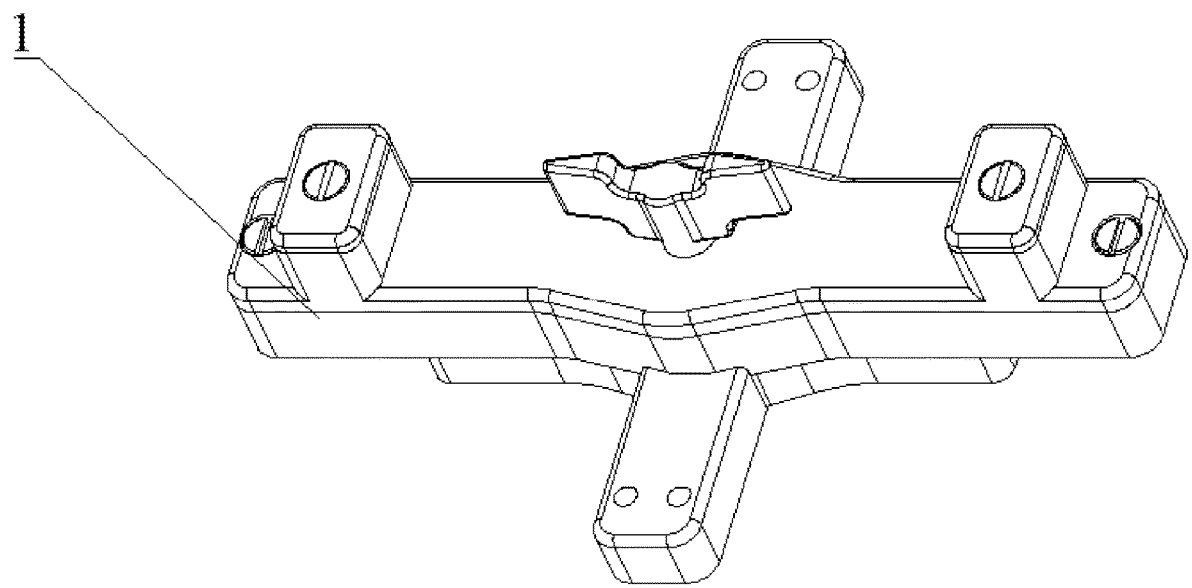
FIG. 8 is a structural schematic view of a "+" shaped box latch according to an embodiment of the present invention.
Figure 9:
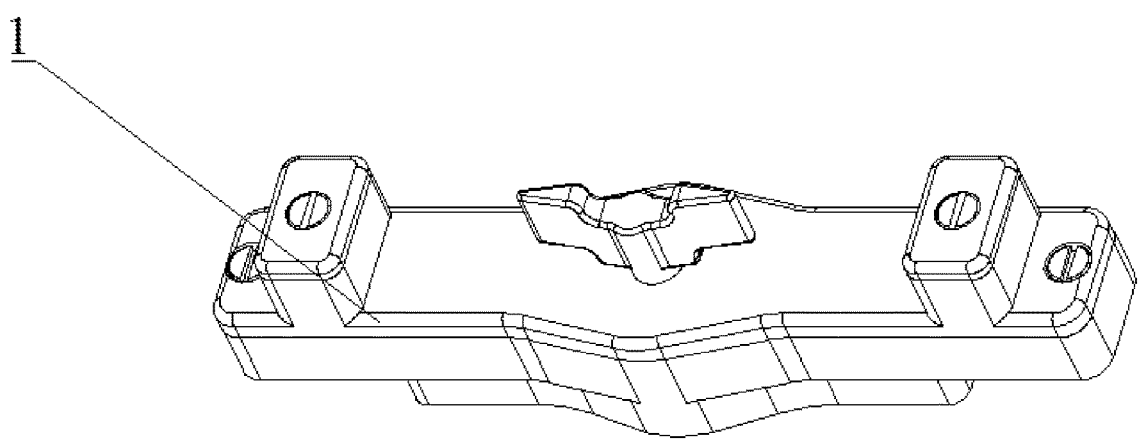
FIG. 9 is a structural schematic view of a "−" shaped box latch according to an embodiment of the present invention.
Figure 10:
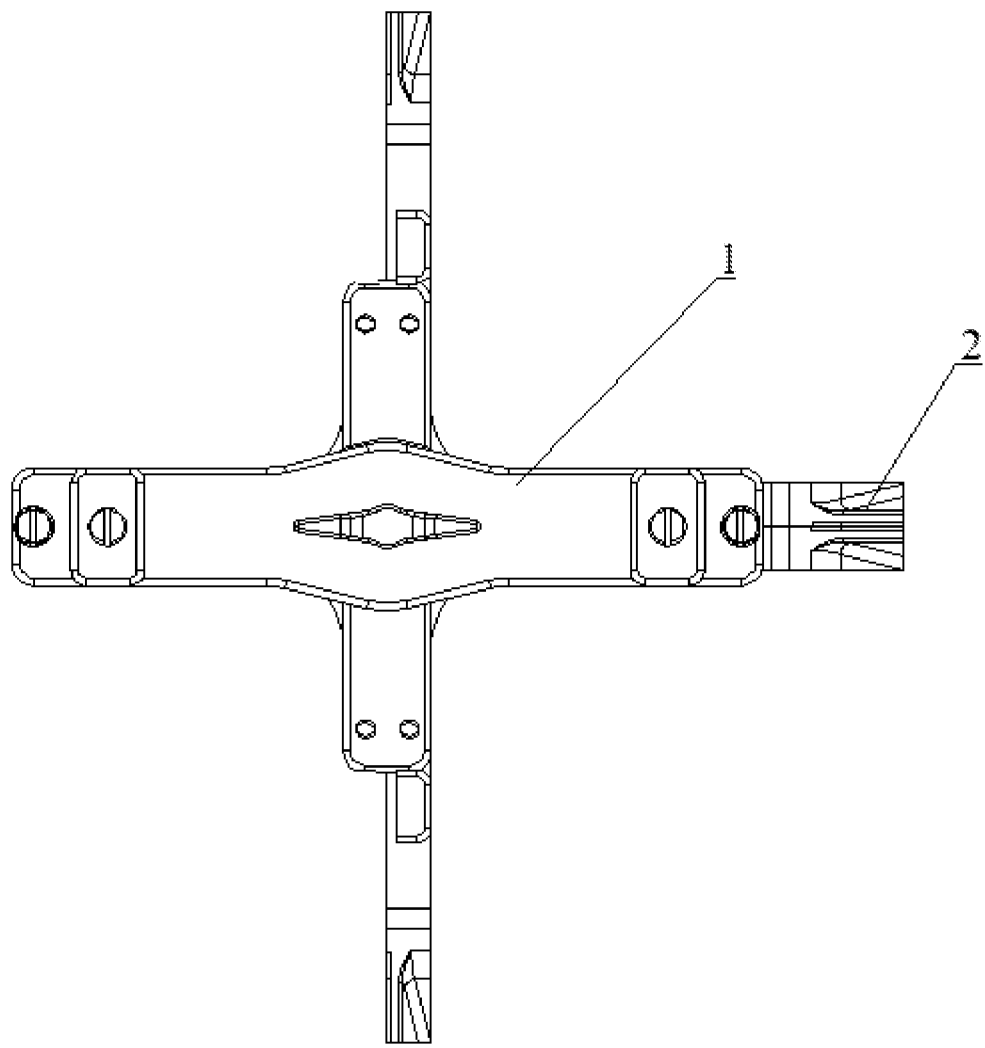
FIG. 10 is a plan view showing two adjacent boxes are spliced and locked by the box latch using the same wedge-shaped pin according to an embodiment of the present invention.
Figure 11:
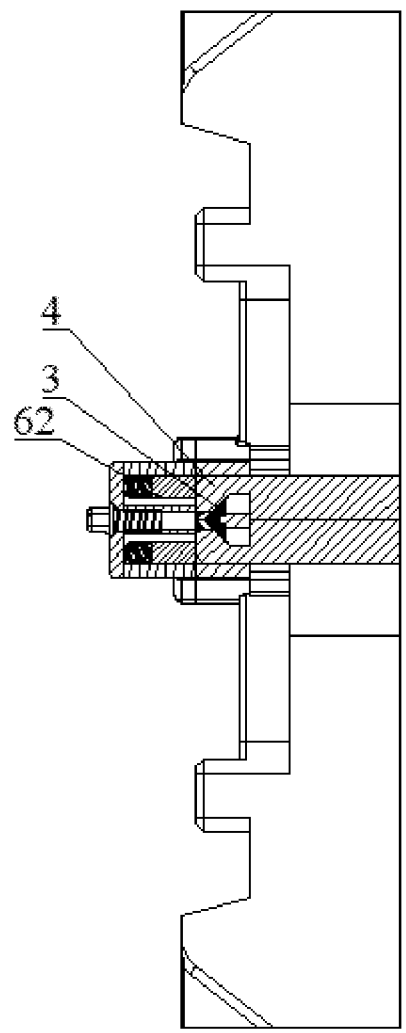
FIG. 11 is a cross-sectional view showing two adjacent boxes are spliced and locked by the box latch using the same wedge-shaped pin according to an embodiment of the present invention.

NUMERALS 1 box latch; 2 box body;
3, wedge-shaped pin; 31, driving part; 32, driven part; 33, driving knob;
301, second protrusion; 311, first protrusion; 321 through hole;
4, mating parts for the notch 5, receiving cavity;
6, latch cover; 61, slot for side stop; 62, side stop; 63, elastic member; 64, stop cover;
71, box positioning member; 72, positioning groove;
81, strip; 82, strip-shaped groove;

DETAILED DESCRIPTION OF THE INVENTION

The following detailed description refers to the accompanying drawings that show, by way of illustration, specific details and embodiments in which the invention may be practiced.

The key of the present invention is that a wedge-shaped pin of the box latch mates with a wedge-shaped notch of the box such that two adjacent boxes can be locked together.

Referring to FIGS. 1 to 21, a wedge-shaped pin is arranged in the box latch. The wedge-shape pin is movable into a wedge-shaped notch formed by mating parts of two spliced adjacent boxes and mating with the wedge-shaped pin, thereby locking the two adjacent boxes.

It can be seen from the above description that the present invention has the following advantages: a box latch provided with a wedge-shaped pin arranged therein, wherein the wedge-shaped pin is movable into a wedge-shaped notch formed by mating parts of two spliced adjacent boxes and mating with the wedge-shaped pin to lock the two adjacent boxes. The wedge-shaped pin of the box latch mates with the wedge-shaped notch of the box such that two adjacent boxes can be locked together. In addition, the wedge-shaped pin and the wedge-shaped notch are shaped and configured to mate with each other such that self-locking occurs when they are locked, thus providing a stable connection of the boxes.

In one embodiment, two wedge-shaped pins are included. The two wedge-shaped pins are symmetrically arranged around the center of the box latch.

It can be seen from the above description that the two wedge-shaped pins are symmetrically arranged around the center the box latch such that only one box latch is required to lock two pairs of adjacent boxes together, reducing the number of splicing steps and box latches required, further saving manpower and material resources.

In another embodiment, receiving cavities are symmetrically arranged on both sides of the box latch for receiving mating parts of the box.

It can be seen from the above description that the receiving cavities allow the mating parts to be arranged within the latch and mate with the wedge-shaped pin such that the wedge-shaped pin fits into the formed wedged-shaped notch.

In yet another embodiment, a latch cover is arranged on the top of the box latch. Side stops are symmetrically arranged on both sides of the latch cover. The side stops mate with the receiving cavities and are movable into the receiving cavities.

Apparently, when two adjacent boxes are spliced and locked by the box latch using two pins, the mating parts of the box insert into the receiving cavities with the side stops moving into the receiving cavities, such that one side of the wedge-shaped pin presses against the mating parts and the other side presses against the side stops, thereby connecting and locking the two adjacent boxes. In addition, the latch may lock 2-4 adjacent boxes due to the side stops, improving the flexibility of the latch.

In yet another embodiment, slots mating with the side stops are arranged symmetrically on both sides of the latch cover. A stop cover is fixed on the top of the slot. An elastic member is arranged inside the slot, having one end connecting to the stop cover and the other end connecting to the side stop.

When the box latch is unlocked, the elastic member causes the side stops to return to the end of the receiving cavity away from the latch cover.

Apparently, when two adjacent boxes are spliced and locked by the box latch using two pins, the mating parts of the box insert into the receiving cavities, and the elastic member causes the side stops return to the end of the receiving cavity away from the latch cover, such that one side of the wedge-shaped pin presses against the mating parts and the other side presses against the side stops, thereby connecting and locking the two adjacent boxes. In addition, the side stops are arranged to improve the flexibility of the latch.

In yet another embodiment, a driving member couples to two wedge-shaped pins respectively. The rotation of the driving member enables linear motion of the wedge-shaped pins towards both ends of the box latch.

It can be seen from the above description that rotation of the driving member force the wedge-shaped pin to move towards the wedge-shaped notch, causing the wedge-shaped pin to move linearly towards both ends of the latch. The wedge-shaped pin moves into the wedge-shaped notch to achieve the connection of the wedge-shaped pin and the wedge-shaped notch, with rotary motion converted into linear motion, so that the boxes can be locked.

In still another embodiment, the driving member is a slider-crank mechanism.

The slider-crank mechanism includes a driving part and a driven part. The driving part is provided with first protrusions arranged symmetrically at both ends on its upper surface.

Two driven parts are included, and the two driven parts are symmetrically arranged around the center of the driving part. A through hole that mates with the first protrusion is arranged at one end of each of the driven parts.

A second protrusion is arranged at one end of the wedge-shaped pin. A through hole that mates with the second protrusion is arranged at the other end of each of the driven parts.

As can be seen from the above description, the driving member is a slider-crank mechanism, in which rotation of the driving part drives the driven part and the driven part force the wedge-shaped pin to move towards both ends of the latch. The cooperation of the slider-crank mechanism and the wedge-shaped pin permits the wedge-shaped pin to linearly move towards both ends of the latch, making the structure simple and inexpensive.

In another embodiment, a driving knob is further included.

The box latch is provided with a through hole that enables the driving knob to pass therethrough.

One end of the driving knob passes through the through hole and permanently couples to the driving part at a point between the two first protrusions.

The driving knob drives the driving part to rotate.

It can be seen from the above description that clockwise or anticlockwise rotation of the driving knob drives the slider-crank mechanism and the wedge-shaped pin, causing the wedge-shaped pin to linearly move towards both ends of the latch. Further, its reciprocating motion can be controlled to facilitate the control of the locking of the latch.

In another embodiment, a positioning groove that mates with a positioning member of the box is arranged at the bottom surface of the box latch.

It can be seen from the above description that the matching between the positioning groove at the bottom surface of the box latch and the positioning member of the box provides a more stable connection of the boxes.

In another embodiment, a strip-shaped groove is arranged at the bottom surface of the wedge-shaped pin. A strip that mates with the strip-shaped groove is arranged inside the box latch. The wedge-shaped pin with the strip-shaped groove may move along the strip.

It can be seen from the above description that the strip groove at the bottom surface of the wedge-shaped pin mates with the strip in the box latch such that the wedge-shaped pin with the strip groove may move along the strip, achieving a simple structure.

Example 1

Referring to FIGS. 1-21, a positioning groove 72 mating with positioning member 71 of the box is arranged at the bottom surface of the box latch 1.

A wedge-shaped pin 3 is arranged in the box latch 1. The wedge-shaped pin 3 is movable into a wedge-shaped notch formed by mating parts 4 of two spliced adjacent boxes 2 and mating with the wedge-shaped pin 3, thereby locking the two adjacent boxes 2. When the adjacent boxes 2 are spliced, the positioning groove 72 at the bottom surface of the box latch is fixed and connected to the positioning member 71 of the box, and the wedge-shaped pin 3 fits into the wedge-shaped notch formed by mating parts 4 of two spliced adjacent boxes 2 and mating with the wedge-shaped pin 3, thereby locking the two adjacent boxes and achieving self-locking, providing a smooth connection between the spliced boxes 2.

Specifically, two wedge-shaped pins 3 are included, and the two wedge-shaped pins 3 are symmetrically arranged around the center of the box latch 1.

Optionally, a positioning block perpendicular to the wedge-shaped pin 3 is symmetrically arranged around the center of the box latch 1. A positioning groove 72 that mates with the positioning member 71 of the box is arranged at the bottom surface of the positioning block, changing the structure of the box latch from a shape of "–" to "+", thereby increasing the stability of the two pairs of spliced adjacent boxes 2. The selection of the above-mentioned box latch having different structure depends on circumstances.

Specifically, a strip-shaped groove 82 is arranged at the bottom surface of the wedge-shaped pin 3. A strip 81 that mates with the strip-shaped groove 82 is arranged in the box latch 1. The wedge-shaped pin 3 with the strip-shaped groove 82 may move along the strip 81 into the mating wedge-shaped notch.

For practical requirement, the bottom surface of the wedge-shaped pin 3 can be designed as an inclined surface, with one end near the center of the box latch 1 lower than the other end away from the center of the box latch 1.

Preferably, the side surface and the bottom surface of the wedge-shaped pin 3 are both designed as an inclined surface, wherein the wedge-shaped pin 3 is tapered from one end near the center of the box latch 1 towards the other end away from the center of the box latch 1 so as to further strengthen stability of the connection of the wedge-shaped pin 3 and the wedge-shaped notch.

Receiving cavities 5 are symmetrically arranged on both sides of the box latch 1 for receiving mating parts 4 of the box 2. The mating parts 4 of two adjacent boxes 2 may be arranged in the receiving cavities 5 and form a wedge-shaped notch mating with the wedge-shaped pin 3.

Preferably, a slight clearance between the wedge-shaped notch and the wedge-shaped pin 3 at its maximum position is acceptable. When inserting and pressing against the notch, the wedge-shaped pin 3 is self-adaptable to the machining error due to the clearance, ensuring that the wedge-shaped pin 3 fits into each of the wedge-shaped notch formed by the mating parts 4 tightly.

The box latch 1 further comprises a driving member coupled to two wedge-shaped pins 3 respectively. The rotation of the driving member enables linear motion of the wedge-shaped pins 3 towards both ends of the box latch.

Specifically, the driving member is a slider-crank mechanism.

The slider-crank mechanism includes a driving part 31 and a driven part 32. The driving part 31 is provided with first protrusions 311 arranged symmetrically at both ends on its upper surface.

Two driven parts 32 are included, and the two driven parts 32 are symmetrically arranged around the center of the driving part. A through hole 321 that mates with the first protrusion 311 is arranged at one end of each of the driven parts 32.

A second protrusion 301 is arranged at one end of the wedge-shaped pin 3. A through hole 321 that mates with the second protrusion 301 is arranged at the other end of each of the driven parts 32.

Preferably, both of the first protrusion 311 and the second protrusion 301 have a cylindrical structure. The through holes at both ends of the driven part 32 are cylindrical through holes and mate with the first protrusion 311 and the second protrusion 301, respectively.

A driving knob 33 is further included.

The box latch 1 is provided with a through hole 321 that enables the driving knob 33 to pass therethrough.

One end of the driving knob 33 passes through the through hole 321 and permanently couples to the driving part 31 at a point between the two first protrusions 311.

The driving knob 33 drives the driving part 31 to rotate.

Preferably, when the wedge-shaped pin 3 fits into the wedge-shaped notch at its maximum position, the limit structure for the driving part 31 may be designed according to practical requirement, such as a ratchet mechanism, to prevent the internal structure of the box latch 1 from being damaged due to misoperation.

The driving member is arranged such that it is movable along the wedge-shaped notch inside the box latch 1. For example, alternatives to the driving slider mechanism comprise a geneva, a rack-and-pinion and a cam.

Example 2

Referring to FIGS. 1-21, Example 2 has the following differences from Example 1.

A latch cover 6 is arranged on the top of the box latch 1. Side stops 62 are symmetrically arranged on both sides of the latch cover 6. The side stops 62 mate with the receiving cavities 5 and are movable into the receiving cavities 5.

Specifically, slots 61 mating with the side stops 62 are arranged symmetrically on both sides of the latch cover 6. A stop cover 64 is fixed on the top of the slot 61. An elastic member 63 is arranged inside the slot 61, having one end connecting to the stop cover 64 and the other end connecting to the side stop 62. When the box latch 1 is unlocked, the elastic member 63 causes the side stops 62 to return to the end of the receiving cavity 5 away from the latch cover 6. The elastic member 63 may be a spring member.

Figure 12:
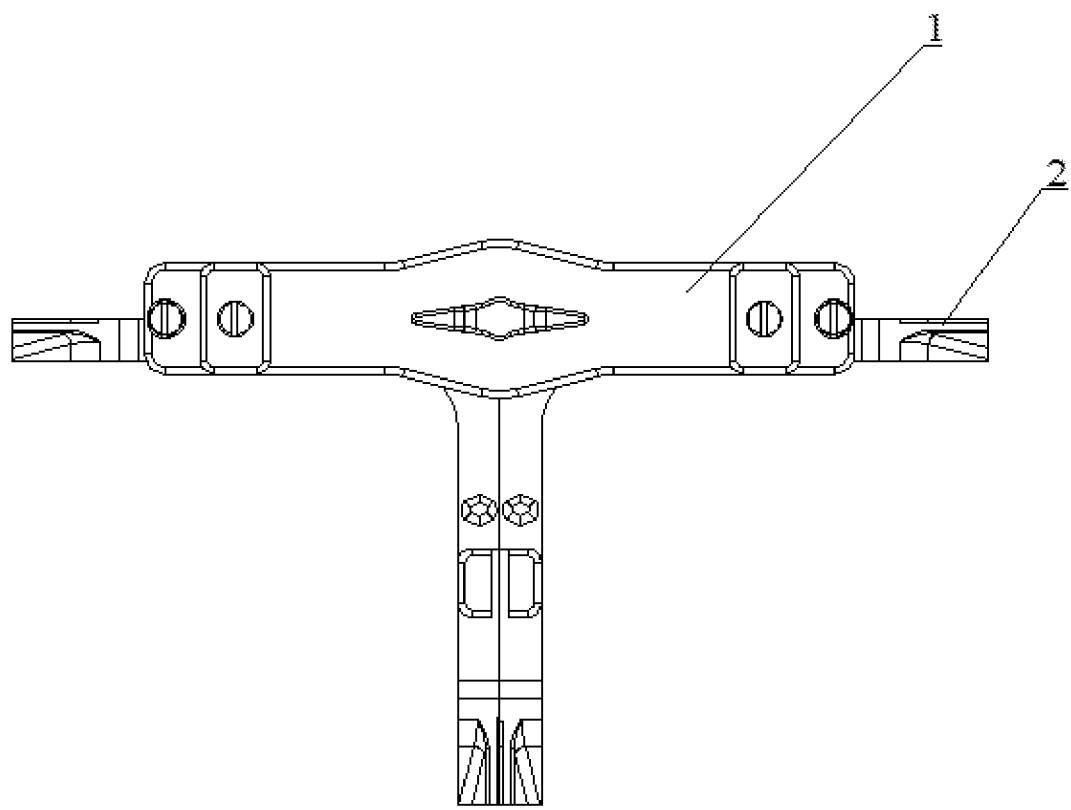
FIG. 12 is a plan view showing two adjacent boxes are spliced and locked by the box latch using two wedge-shaped pins according to an embodiment of the present invention.
Figure 13:
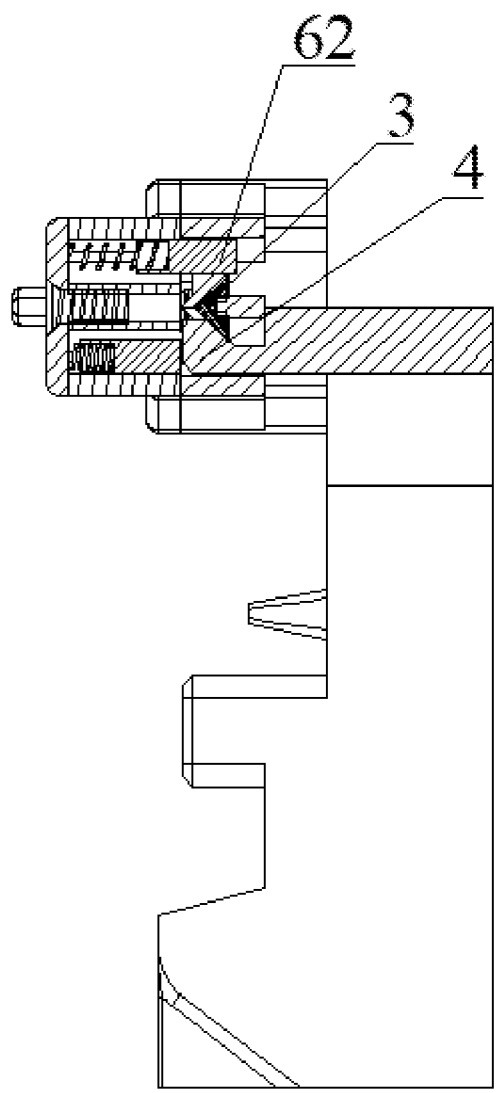
FIG. 13 is a cross-sectional view showing two adjacent boxes are spliced and locked by the box latch using two wedge-shaped pins according to an embodiment of the present invention.

As shown in FIGS. 12-13, when the box latch 1 connects to the edge of two boxes 2, the mating parts 4 of the boxes 2 insert into the receiving cavities 5, and the elastic member 63 causes the side stops 62 return to the end of the receiving cavity 5 away from the latch cover 6, such that one side of the wedge-shaped pin 3 presses against the mating parts 4 and the other side presses against the side stops 62, thereby connecting and locking the two adjacent boxes 2. The side stops 62 make it possible to lock two adjacent boxes 2 arranged on the same side of a wedge-shaped pin 3 or two adjacent boxes 2 respectively connecting to separate wedge-shaped pin 3. Such structure is suitable for connecting LED boxes, where the latch is applied at the edge of the screen to mate with only two boxes.

Figure 14:
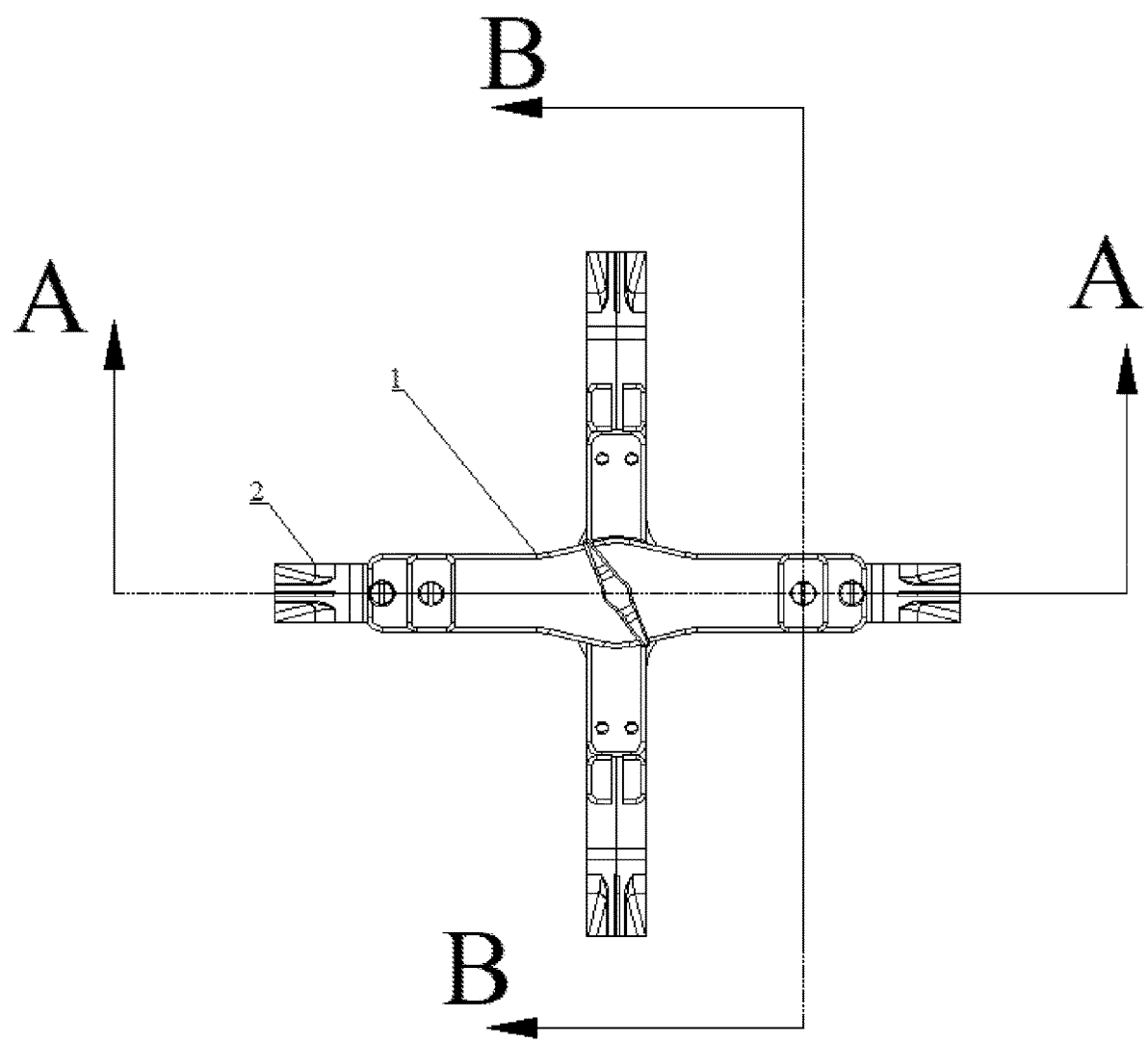
FIG. 14 is a top view of an unlocked box latch connected with two pairs of adjacent boxes according to an embodiment of the present invention.
Figure 15:
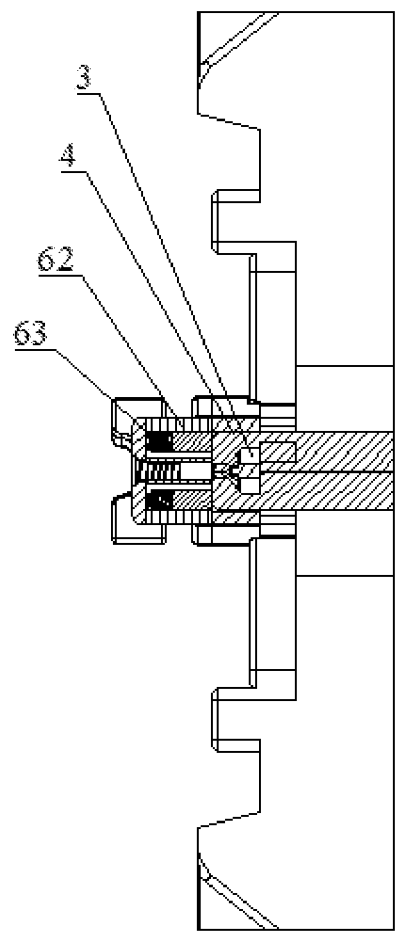
FIG. 15 shows section B-B of FIG. 14.
Figure 16:
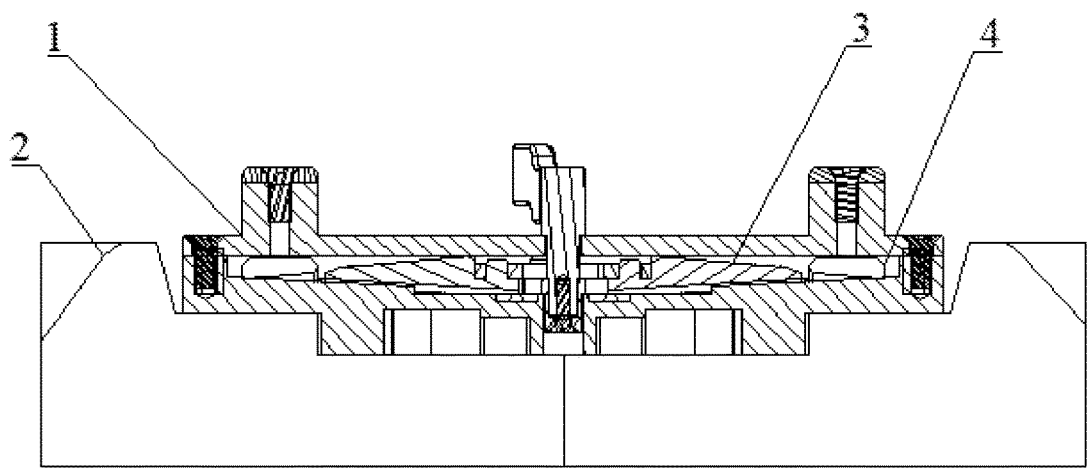
FIG. 16 shows section A-A of FIG. 14.

FIGS. 14-16 show an unlocked box latch 1 connected with two pairs of adjacent boxes 2. When the latch 1 is unlocked, the side stop 62 presses against the mating part 4 of the box 2 and back to the slot 61.

Figure 17:
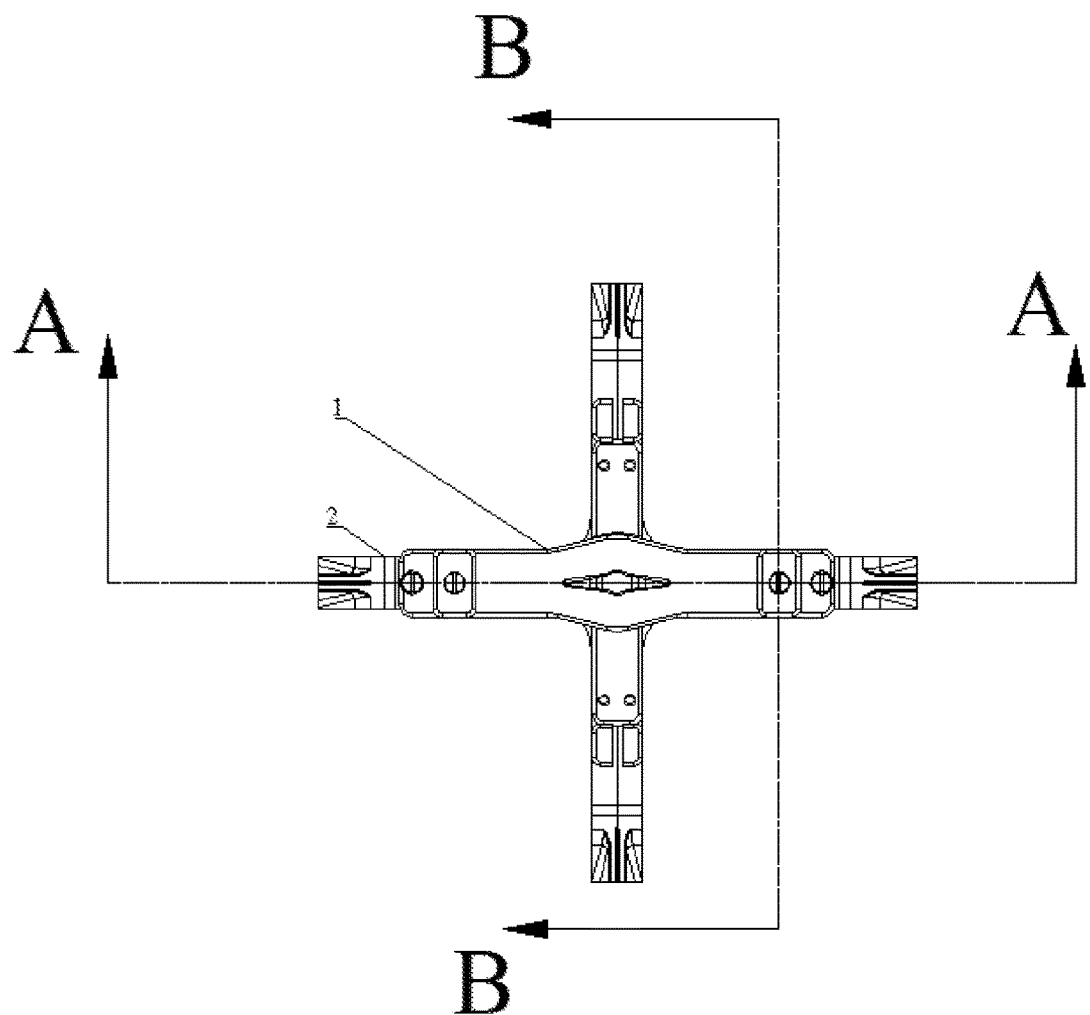
FIG. 17 is a top view of a locked box latch connected with two pairs of adjacent boxes according to an embodiment of the present invention.
Figure 18:
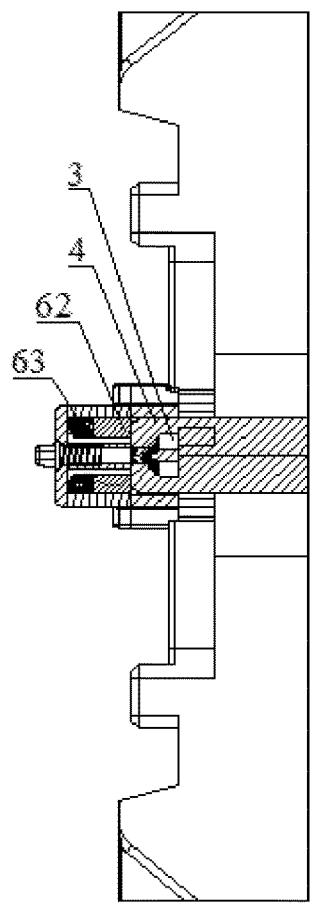
FIG. 18 shows section B-B of FIG. 17.
Figure 19:
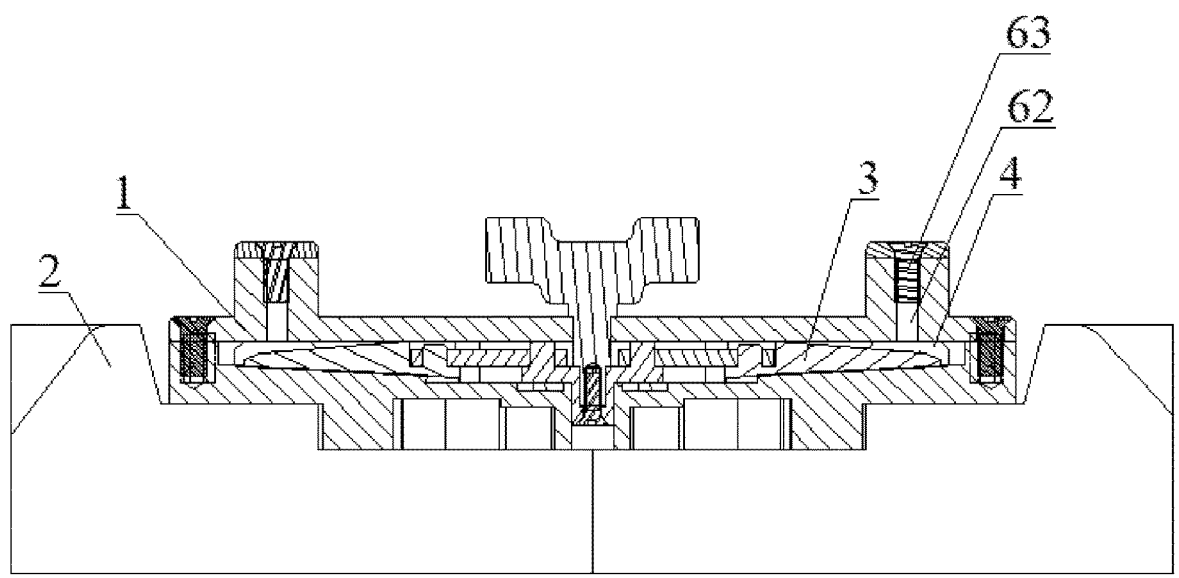
FIG. 19 shows section A-A of FIG. 17.
Figure 20:
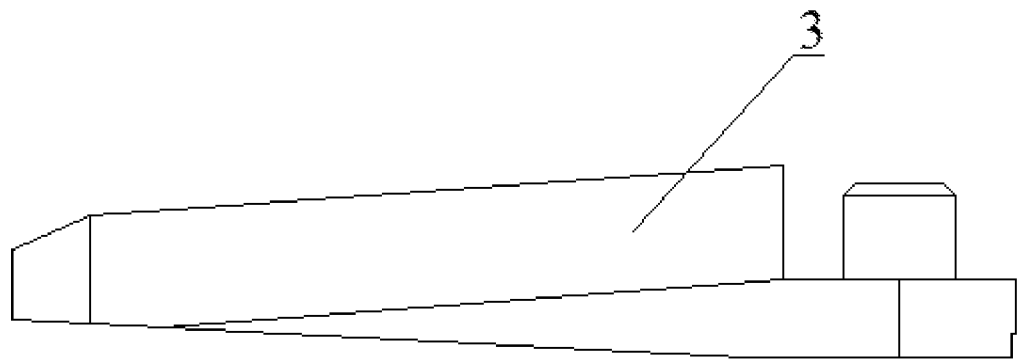
FIG. 20 is a side view of a wedge-shaped pin according to an embodiment of the present invention.
Figure 21:
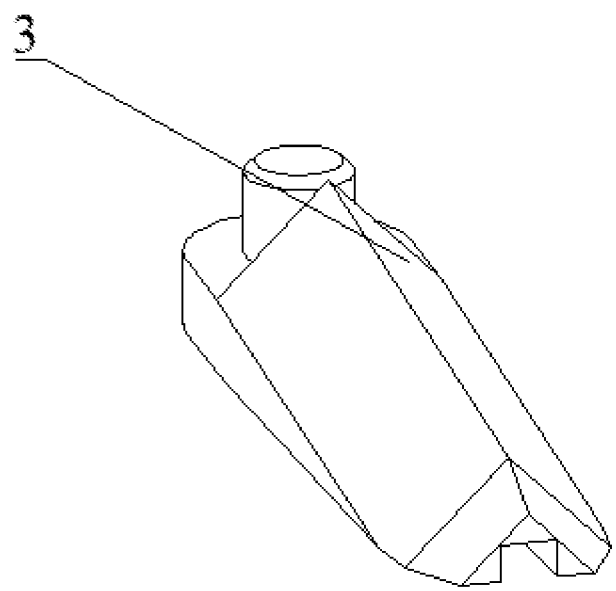
FIG. 21 is a schematic structural view of a wedge-shaped pin according to an embodiment of the present invention.

FIGS. 17-19 show a locked box latch 1 connected with two pairs of adjacent boxes 2. The wedge-shaped pin 3 slides to the wedge-shaped notch formed by the mating parts such that the pin connects to the notch.

The flexibility of boxes 2 connected by the box latch 1 is greatly enhanced due to the side stops 62, which make it possible to connect 2-4 boxes arranged at any position. For example, it is possible to connect two adjacent boxes 2 or two boxes 2 arranged diagonally.

In summary, the present invention provides a box latch, wherein the box latch is provided with two wedge-shaped pins symmetrically arranged around its center, and the two wedge-shaped pins are movable into a wedge-shaped notch formed by mating parts of two spliced adjacent boxes and mating with the wedge-shaped pin to lock the two adjacent boxes. The wedge-shaped pin of the box latch mates with the wedge-shaped notch of the box such that two adjacent boxes can be locked together. The two wedge-shaped pins are symmetrically arranged around its center such that only one box latch is required to lock two adjacent boxes together, reducing the number of splicing steps and box latches, further saving manpower and material resources. In addition, the wedge-shaped pin and the wedge-shaped notch are shaped and configured to mate with each other such that self-locking occurs when they are locked, thus providing a stable connection of the boxes. When only two adjacent boxes are spliced, the side stops make it possible to lock two adjacent boxes arranged either on the same side or different sides of the wedge-shaped pin.

It should be noted that the above implementations are only used to explain the technical solutions of the present application, and are not limited thereto. Those skilled in the art should understand that the modifications or equivalent substitutions of the present application are not intended to be excluded from the scope of the invention.

What is claimed is:

1. A box latch, characterized in that a wedge-shaped pin is arranged in the box latch,
    wherein the wedge-shaped pin is movable into a wedge-shaped notch formed by mating parts of two spliced adjacent boxes and mating with the wedge-shaped pin to lock the two adjacent boxes,
    wherein the box latch further comprises
        receiving cavities symmetrically arranged on both sides of the box latch for receiving the mating parts of the box, and
        a latch cover arranged on the top of the box latch,
    side stops mating with the receiving cavities and symmetrically arranged on both sides of the latch cover, and
    a strip-shaped groove arranged at the bottom surface of the wedge-shaped pin, a strip mating with the strip-shaped groove and arranged in the box latch,
    wherein the wedge-shaped pin with the strip-shaped groove moves along the strip,
    wherein the side stops are movable into the receiving cavities.

2. The box latch according to claim 1, wherein two wedge-shaped pins symmetrically arranged around the center of the box latch are included.

3. The box latch according to claim 1, further comprising slots mating with the side stops and arranged symmetrically on both sides of the latch cover,
    a stop cover fixed on the top of the slots,
    an elastic member arranged inside the slot, having one end connecting to the stop cover and the other end connecting to the side stop,
    wherein the elastic member causes the side stops to return to the end of the receiving cavity away from the latch cover when the box latch is unlocked.

4. The box latch according to claim 2, further comprising a driving member coupled to the two wedge-shaped pins respectively, wherein rotation of the driving member enables linear motion of the wedge-shaped pins towards both ends of the box latch.

5. The box latch according to claim 4, wherein the driving member is a slider-crank mechanism,
    wherein the slider-crank mechanism comprises a driving part and a driven part, and the driving part is provided with first protrusions arranged symmetrically at both ends on its upper surface,
    wherein two driven parts symmetrically arranged around the center of the driving part are included, and a through hole that mates with the first protrusion is arranged at one end of each of the driven parts, and
    wherein a second protrusion is arranged at one end of the wedge-shaped pin, and a through hole that mates with the second protrusion is arranged at the other end of each of the driven parts.

6. The box latch according to claim 5, further comprising a driving knob,
    wherein the box latch is provided with a through hole that enables the driving knob to pass therethrough,
    wherein one end of the driving knob passes through the through hole and permanently couples to the driving part at a point between the two first protrusions; and
    wherein the driving knob drives the driving part to rotate.

7. The box latch according to claim 1, further comprising a positioning groove mating with a positioning member of the box and arranged at the bottom surface of the box latch.

8. The box latch according to claim 3, further comprising a positioning groove mating with a positioning member of the box and arranged at the bottom surface of the box latch.

9. The box latch according to claim 6, further comprising a positioning groove mating with a positioning member of the box and arranged at the bottom surface of the box latch.

* * * * *